Nov. 24, 1953 W. A. LAWSON 2,660,217
METHOD OF PRODUCING MASONRY SIMULATING PANEL
Filed March 2, 1950 7 Sheets-Sheet 4
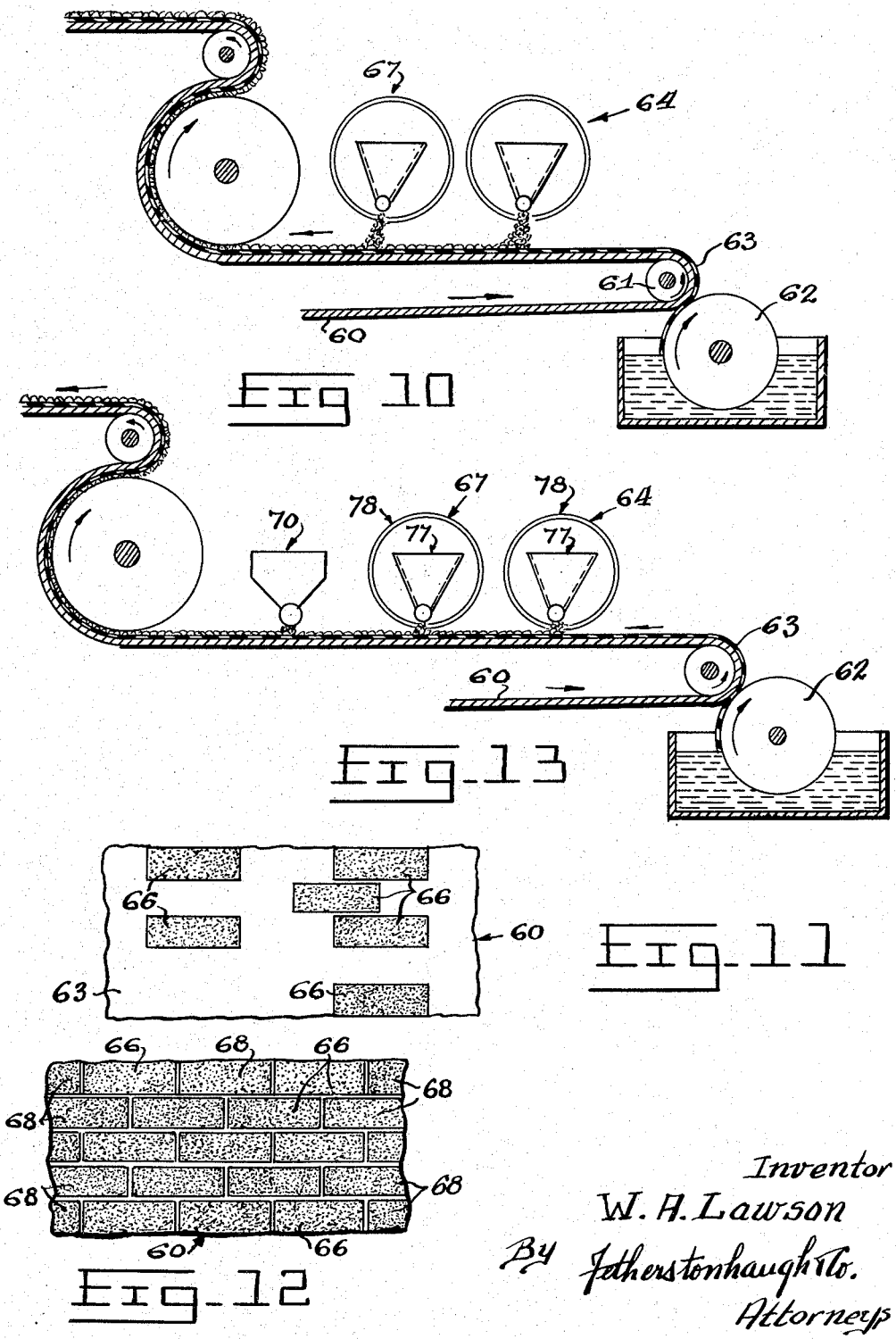
Inventor
W. A. Lawson
By Fetherstonhaugh & Co.
Attorneys Nov. 24, 1953 W. A. LAWSON 2,660,217
METHOD OF PRODUCING MASONRY SIMULATING PANEL
Filed March 2, 1950 7 Sheets-Sheet 5
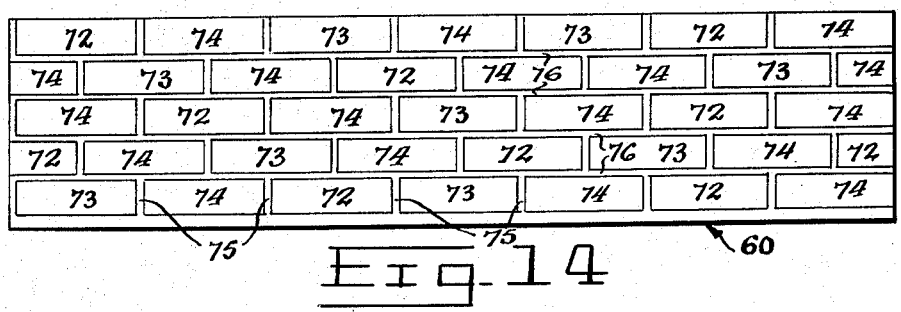
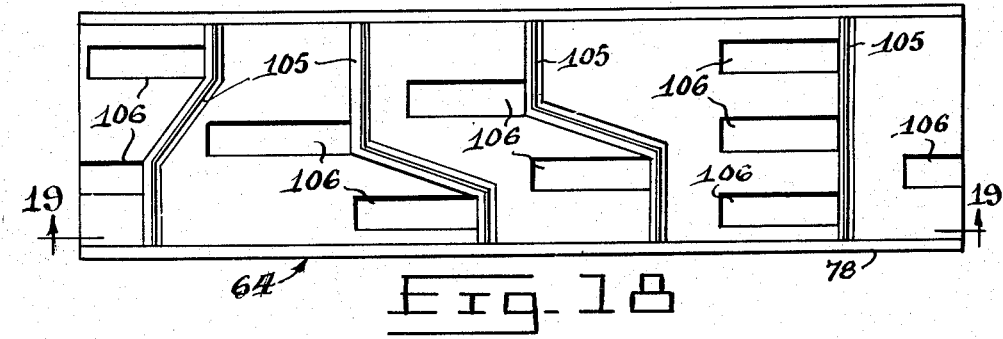
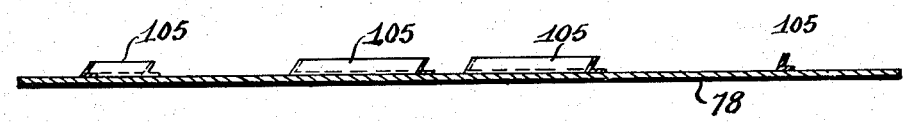
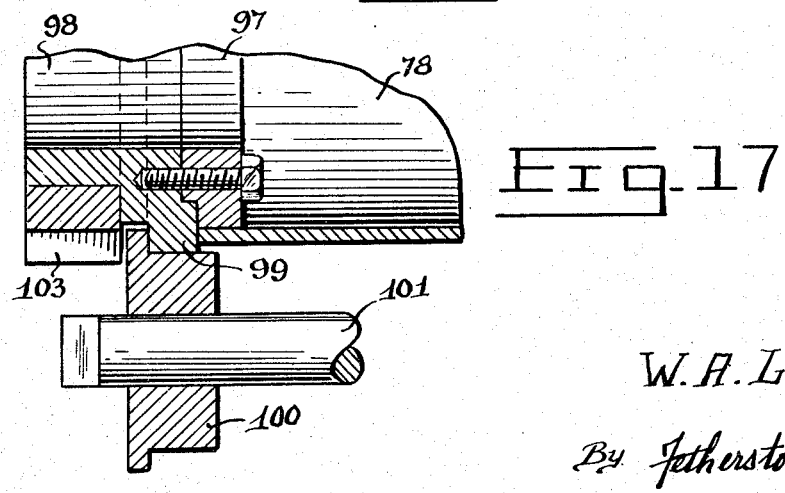
Inventor:
W. A. Lawson
By Fetherstonhaugh & Co.
Attorneys Nov. 24, 1953  W. A. LAWSON  2,660,217
METHOD OF PRODUCING MASONRY SIMULATING PANEL
Filed March 2, 1950  7 Sheets-Sheet 6
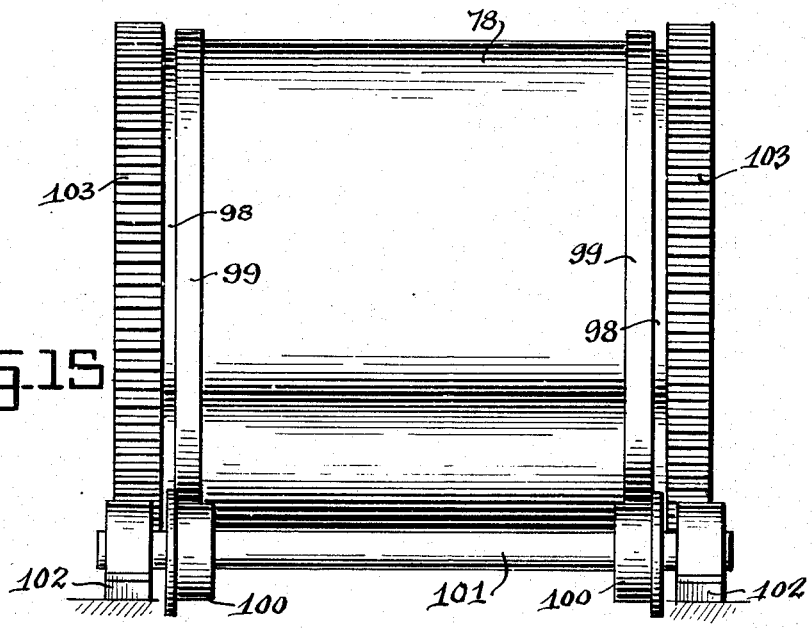
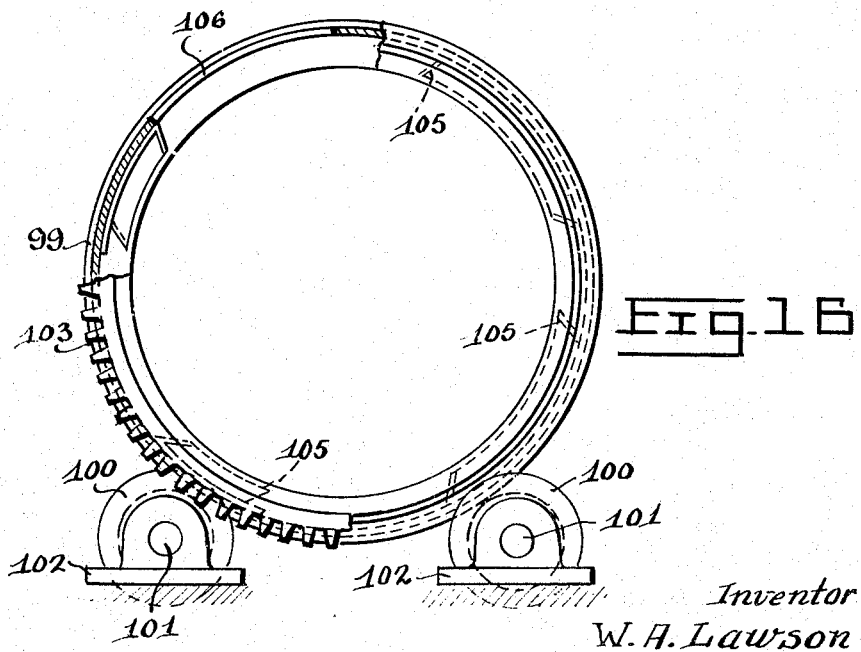
Inventor
W. H. Lawson
By Featherstonhaugh & Co.
Attorneys Nov. 24, 1953     W. A. LAWSON     2,660,217
METHOD OF PRODUCING MASONRY SIMULATING PANEL
Filed March 2, 1950     7 Sheets-Sheet 7
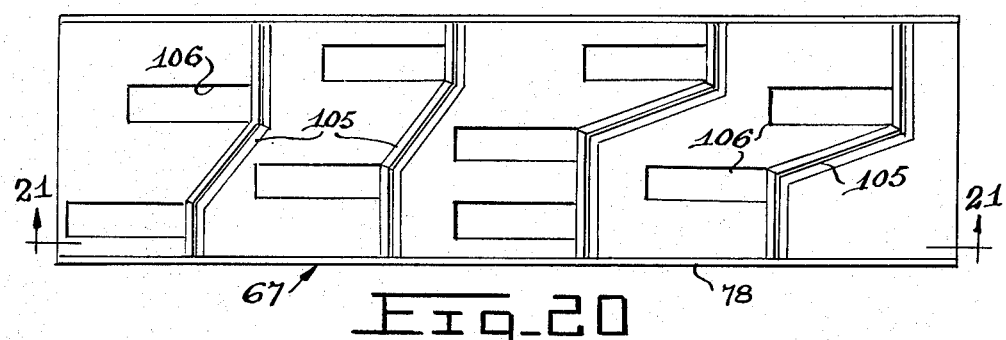
Fig. 20
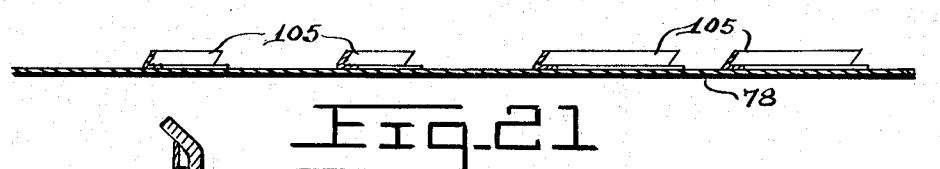
Fig. 21
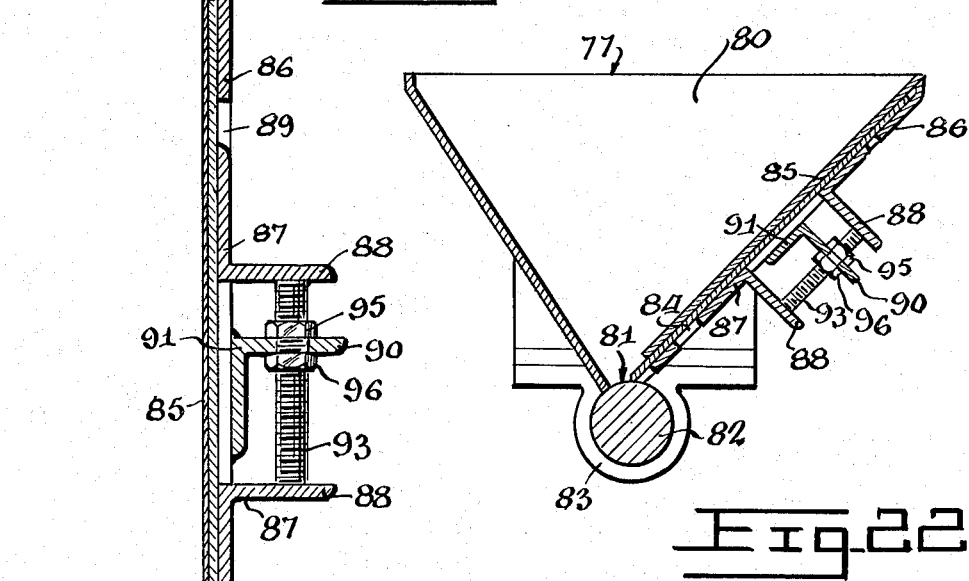
Fig. 22
Fig. 23
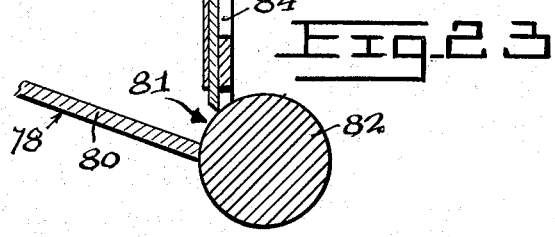
Inventor
W. A. Lawson
By Fetherstonhaugh & Co.
Attorneys Patented Nov. 24, 1953

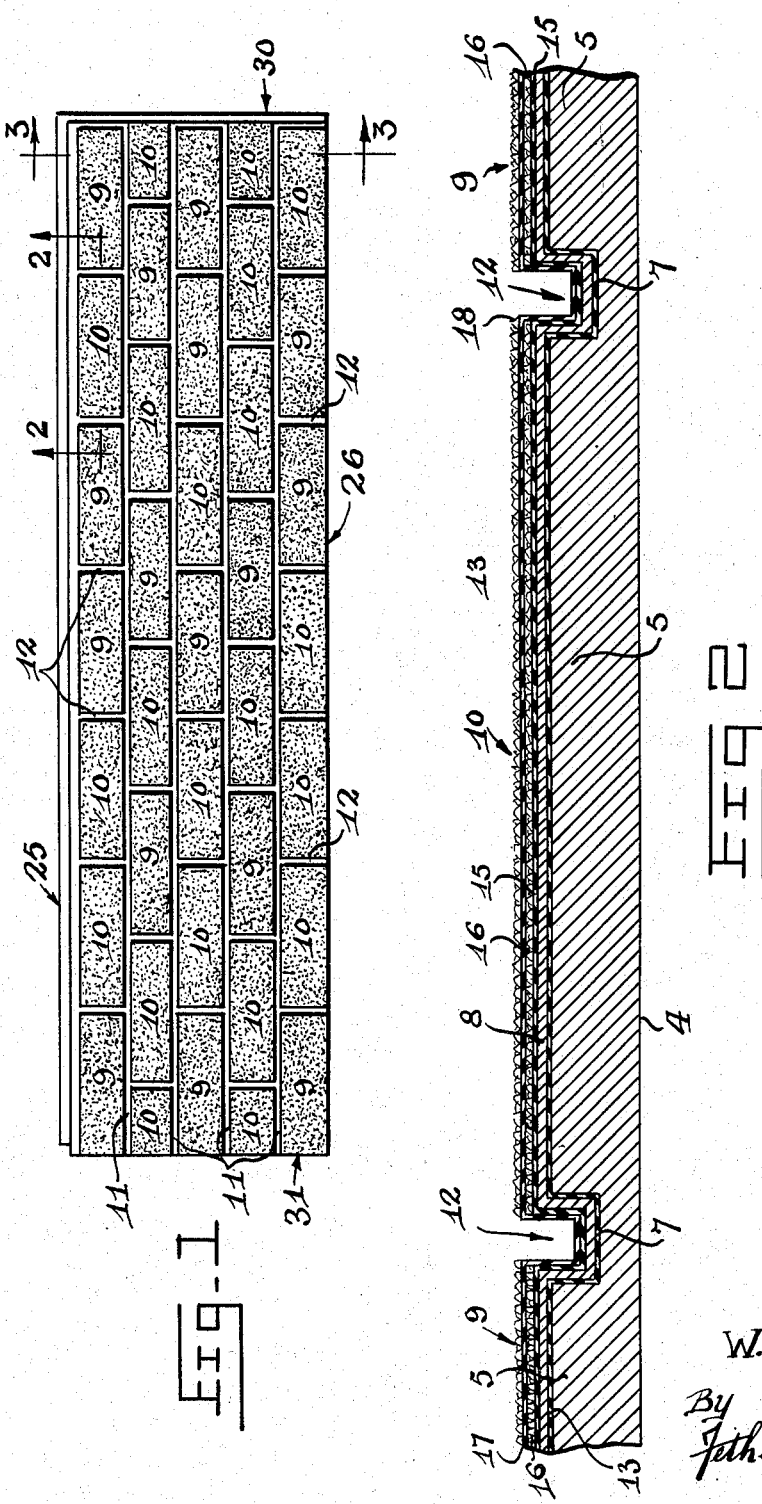

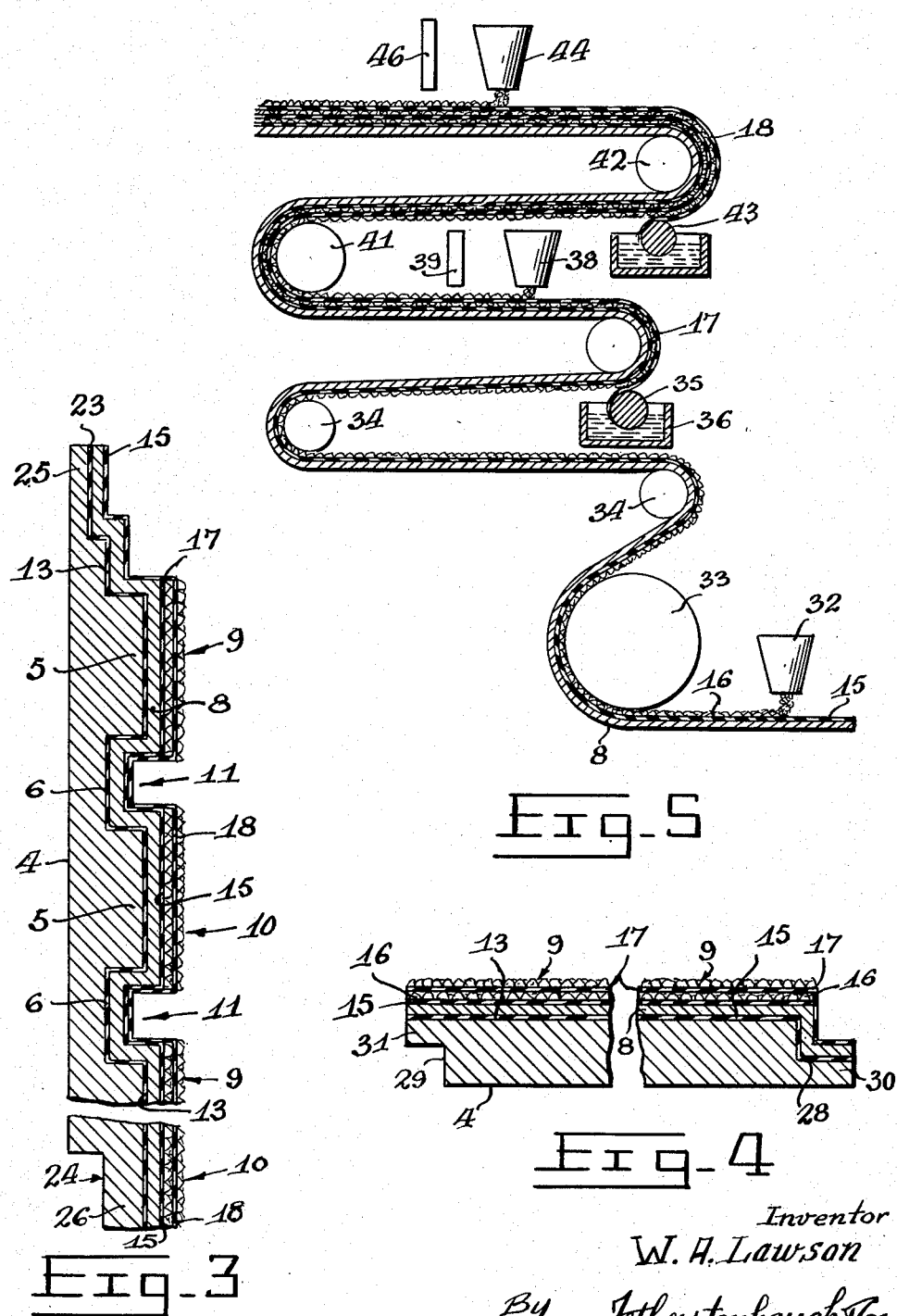

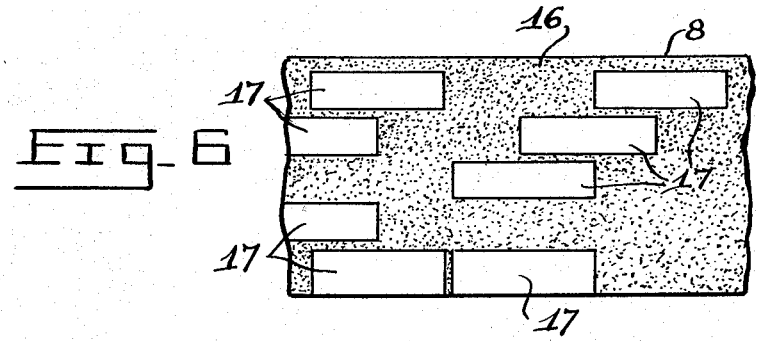
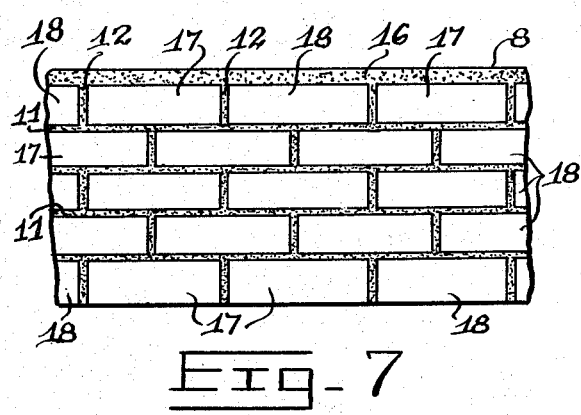
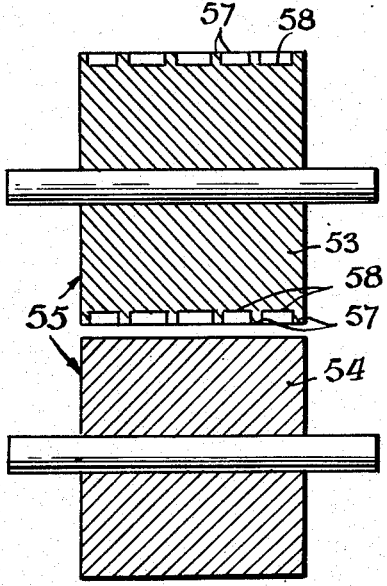
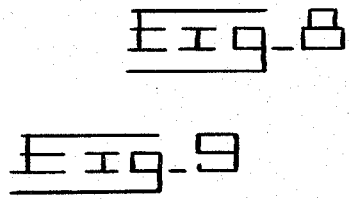

2,660,217

UNITED STATES PATENT OFFICE 2,660,217

METHOD OF PRODUCING MASONRY SIMULATING PANEL

William A. Lawson, Montreal, Quebec, Canada, assignor to Building Products Limited, Montreal, Quebec, Canada Application March 2, 1950, Serial No. 147,316

3 Claims. (Cl. 154—41)

This invention relates to improvements in masonry simulating siding panels and to a method and apparatus for producing same and is particularly concerned with ornamental, granular surfaced, insulating siding panels of the brick or stone simulating type.

One object of the invention is the provision of an improved granular surfaced masonry-simulating insulating panel in which the granular surfaced masonry simulating areas are contrastingly colored to give an improved appearance.

Another object of the invention is the provision of a method of manufacture whereby the granular surfaced brick or stone simulating areas are formed with even and sharply defined marginal edges which further improve the appearance of the panel.

A further object is the provision of simple and efficient apparatus for carrying out the aforesaid method of manufacture.

Other objects, advantages and characteristic features of the invention will be more readily understood from the following detailed description taken in connection with the accompanying drawings, wherein—

Fig. 1 is a plan view of an ornamental insulating siding panel embodying the invention.

Fig. 2 is an enlarged fragmentary longitudinal sectional view taken on the section line 2—2 of Fig. 1.

Fig. 3 is an enlarged vertical sectional view taken on the section line 3—3 of Fig. 1.

Fig. 4 is a fragmentary longitudinal sectional view of a complete panel and shows the manner in which the ends of the panel are formed to provide vertical shiplap joints between panels in the same row.

Fig. 5 is a diagrammatic view of an apparatus whereby the coating and granular surfacing of the cap sheet forming part of the panel shown in the preceding figures is carried out as a continuous process.

Figs. 6 and 7 are fragmentary plan views of the cap sheet and show successive steps in the surfacing of the cap sheet to provide the ornamental brick simulating design.

Fig. 8 is a sectional view of the component rolls of a cold roll molding or pressing unit used in the production of the completed panel shown in Figs. 1 to 3 inclusive.

Fig. 9 is a sectional view of the component rolls of a hot roll molding or pressing unit also used in the production of the completed panel.

Figs. 10 to 12 inclusive illustrate an alternate method which may be employed in surfacing the cap sheet to provide thereon brick simulating areas of contrasting color characteristics.

Figs. 13 and 14 illustrate a further modification of the procedure employed for applying brick-simulating areas of contrasting color to the cap sheet.

Fig. 15 is a side elevational view of one of the special color drifts employed in the surfacing procedure illustrated in Figs. 10 to 14 inclusive.

Fig. 16 is an end elevation of the color drift shown in Fig. 15.

Fig. 17 is a detail view of a portion of the color drift shown in Figs. 15 and 16.

Fig. 18 is a plan view showing a flat development of the cylinder wall of the color drift diagrammatically shown at 64 in Figs. 10 and 13.

Fig. 19 is a longitudinal sectional view of the cylinder wall shown in Fig. 18, the plane of the section being substantially along the section line 19—19 of Fig. 18.

Fig. 20 is a plan view showing a flat development of the cylinder wall of the color drift diagrammatically shown at 67 in Figs. 10 and 13.

Fig. 21 is a longitudinal sectional view of the cylinder wall shown in Fig. 20, the plane of the section being substantially along the section line 21—21 of Fig. 20.

Fig. 22 is a vertical sectional view of one of the hopper units forming part of the color drifts diagrammatically shown at 64 and 67 in Fig. 13.

Fig. 23 is an enlarged detail view of a portion of the hopper unit shown in Fig. 22.

One type of finished brick simulating siding panel produced in accordance with the invention is shown in Figs. 1 to 4 inclusive. It comprises an insulating base 4 provided with a preformed brick wall design consisting of raised brick simulating areas 5 and sunken or depressed longitudinally and transversely extending mortar joint simulating areas 6 and 7. The brick wall design of the base is covered by a granular surfaced cap sheet 8 presenting spaced brick simulating areas 9 and 10 and longitudinally and transversely extending mortar joint simulating areas 11 and 12, the latter being depressed into the mortar joint simulating areas 6 and 7 of the base. The cap sheet is united to the base by pressing it against an adhesive coating 13 of asphalt previously applied to the brickwall design of the base.

The base 4 may be made of compressed paper, woodpulp or other fibrous materials commonly employed in the manufacture of wallboard or insulating board. The fibrous mass of the base may be of a homogeneous character or may consist of separate layers of fibrous material bonded together by asphalt or other suitable adhesive employed in the manufacture of laminated insulating board.

Prior to the application of cap sheet 8 the base 4 is saturated with cracking coal tar or other suitable waterproofing substance preferably of an asphaltic or bituminous nature and is then provided with the previously mentioned adhesive coating 13 of asphalt covering the brick wall design afforded by the raised brick simulating areas 5 and the intervening depressed mortar joint simulating areas 6 and 7.

The cap sheet 8 is made of roofing felt saturated with a waterproof compound such as tar, petroleum or asphalt and is provided on its weather side with a coating layer 15 of asphalt in which suitable granules are partially embedded to form a continuous granular surface layer 16. The granular surface layer 16 is covered by spaced patches 17 and 18 of asphalt in which further granules are partially embedded to form raised granular surfaced brick simulating areas 9 and 10 between which narrow portions of the granular surface layer 16 are exposed to simulate the longitudinally and transversely extending mortar joints 11 and 12.

An important feature of the invention resides in the fact that the brick simulating areas 9 of the cap sheet 8 are surfaced by a granular mix of predetermined color characteristics contrasting with the color characteristics of the granular mix employed for surfacing the brick simulating areas 10. For example, each of the brick simulating areas 9 of the cap sheet may be surfaced with a granular mix of predominantly red color characteristics consisting of a blend of 80% red granules and 20% brown granules. The remaining brick simulating areas 10 of the cap sheet may be surfaced with a granular mix of predominantly brown color characteristics consisting of a blend of 80% brown granules and 20% red granules. This provides a panel of substantially improved appearance as compared with panels in which all of the brick simulating areas of the cap sheet are surfaced with a granular mix of the same color characteristics.

Another important characteristic of the panel described herein is that the brick simulating areas of the cap sheet 8 are defined by straight, even, marginal edges which not only improve the appearance of the brick simulating areas but also cause them to stand out in sharper contrast with the intervening mortar joint simulating areas. This effect is obtained by a hot pressing operation to which the mortar joint simulating areas of the cap sheet are subjected after the cap sheet has been assembled with the base.

As shown in Fig. 3 the base of the panel is provided with an inner horizontal recess 23 adjacent its upper edge and an outer horizontal recess 24 adjacent its lower edge. Recess 23 provides a tongue 25 which is covered on its inner side by the upper edge portion of cap sheet 8. Recess 24 provides a tongue 26 projecting below the main body of the base and covered by the lower edge of the cap sheet. When a plurality of rows of panels are assembled on the surface to be covered the tongue 26 at the lower edge of each panel is fitted over the tongue 25 at the upper edge of the next lower panel to provide a shiplap weatherproofing joint. The base 4 of the panel is also provided, at one end (Fig. 4), with an inner recess 28 and at the opposite end with an outer recess 29. The recess 28 forms a tongue 30 which is covered at its inner side by one end of the cap sheet 8. The recess 29 forms a tongue 31 which is covered on its inner side by the other end of the cap sheet 8. When a plurality of panels are assembled on the surface in superimposed rows or courses the end tongue 31 of one panel fits over the end tongue 30 of the next adjacent panel in the same row to provide a vertically extending shiplap joint.

In producing the panel described herein the base 4 is cut to size and then grooved to provide the brick simulating areas 5, the mortar joint simulating areas 6 and 7 and the recesses 23, 24, 28 and 29. The base 4 is then saturated with cracking coil tar or other waterproofing substance of an asphaltic or bituminous nature and is provided, at one side, with the previously mentioned coating layer 13 of asphalt to provide an adhesive surface for the bonding of the cap sheet 8 to the base.

The coating and granular surfacing of the weatherproofed cap sheet 8 may be carried out as a continuous process, as illustrated in Fig. 5. As here shown, a traveling web 8 of roofing felt, which has previously been saturated with asphalt or other suitable waterproofing compound and coated on one side with a tacky base layer 13 of asphalt in transit, is passed beneath a color drift 32 which deposits a continuous layer 16 of granular particles on the upper surface of the asphalt coating 15. From the color drift 32 the asphalt is passed around guide rolls 33 and 34 so that the granular surface layer 16 is brought into contact with an asphalt pick-up roll 35 having its lower portion submerged in a body of asphalt contained in a suitable tank or vessel 36. The pick-up roll 35 is a pattern type roll designed to apply to the granular surface the previously mentioned spaced brick simulating patches 17 of asphalt as shown in Figs. 2, 3, 5 and 6. From the pick-up roll 35 the web 8 is passed beneath the color drift 38 which deposits a second layer of granules on the web to form the previously mentioned brick simulating areas 9. In this connection it will be understood that the granules deposited on the brick simulating patches 17 of asphalt are retained thereon while the loose granules deposited on the areas lying between these asphalt patches 17 are subsequently removed by air or suction applied through a suitable conduit 39 beneath which the web passes as it travels beyond the color drift 38. From the conduit 39 the web is passed around guide rolls 41 and 42 into contact with a second pick-up roll 43 which is similar to the pick-up roll 35 and serves to deposit on the web the previously mentioned brick simulating asphalt patches 18, as shown in Figs. 2, 3 and 7.

From the pick-up roll 43 the web passes beneath a second color drift 44 which deposits thereon a further layer of granular particles on the web to form the brick simulating areas 10. As the web passes beyond the color drift 44 the last mentioned particles of granular material which are deposited on the asphalt patches 18 adhere thereto but the granules deposited on portions of the web lying outside the brick simulating asphalt patches 18 are removed by air or suction applied through a suction conduit 46. Following these operations the web is cut into a plurality of cap sheets 8 of the required size and each cap sheet is then applied to a base 4 by placing it on the asphalt coating layer 13 of the base. This assembly is then passed between 83 carried by said hopper. The amount of material delivered from the hopper is regulated by adjustment of a feed regulating gate 84 sliding in a suitable guideway formed by and between the hopper wall 85 and an outer stationary guide plate 86 secured to the hopper. As more clearly shown in Fig. 22, the gate 84 carries upper and lower angle members 87, each presenting an arm 88 projecting outwardly through an elongated slot 89 provided in guide plate 86. The arms 88 are positioned above and below the flange 90 of an angle bar 91 which is secured to guide plate 86 and extends across an intermediate portion of slot 89. The flange 90 of angle bar 91 is provided with an opening 92 for the passage of an adjusting screw 93 having its ends welded to the arms 88 of the angle members 87 carried by gate 84. Nuts 95 and 96 are positioned above the flange 90 of angle bar 91 in screw-threaded engagement with screw 93 and co-operate with said screw and flange to provide a means for adjusting the gate 84 toward and away from the feed roller 82 to thereby regulate the amount of granular material delivered from hopper 80.

As shown to advantage in Figures 15 to 17 inclusive, the cylinder 78 of each of the color drifts 64 and 67 is provided with internal end rings 97 bolted to mounting rings 98. The mounting rings are provided with flanges 99 rotatably supported by two pairs of flanged supporting rollers 100 carried by parallel shafts 101 journalled in suitable bearings 102. The mounting rings 98 also carry ring gears 103 which are driven by suitable drive pinions (not shown).

Each cylinder 78 is provided with a plurality of spaced internal ribs 105 and with elongated circumferentially extending slots 106 located between said ribs. These ribs and slots are arranged in accordance with a predetermined pattern. For example, Figures 18 to 20 inclusive illustrate the pattern arrangement of the cylinder ribs and slots of the color drifts 64 and 67 used in the cap sheet surfacing method shown in Figures 13 and 14. In this case, the cylinder slots 106 of color drift 64 are arranged according to the pattern shown in Figure 18 and the patches of granular material deposited on the web or cap sheet 60 through these slots, during rotation of the cylinder, form the brick-simulating areas indicated at 72 in Figure 14. The cylinder slots 106 of color drift 67 are arranged according to the pattern shown in Figure 20 and the patches of granular material deposited on the web or cap sheet 60 through these slots form the brick-simulating areas indicated at 73 in Figure 14. The remaining brick-simulating areas 74, shown in Figure 14, are formed by granular material which is deposited by the conventional color drift 70 in a single layer covering the whole width and length of the web or cap sheet 60 but which adheres only to those areas of the asphalt-coated side of the web or cap sheet which have not previously been covered by the granular material deposited by the color drifts 64 and 67. The particles of the granular material which are deposited by the conventional color drift 70 and fall on the previously applied granular brick-simulating patches 72 and 73, fall away from the web or cap sheet or are removed pneumatically by blowing or suction.

It will be noted that all of the cylinder ribs shown in Figures 18 to 21 inclusive, with the exception of the right hand rib shown in Figure 18, extend between the ends of their respective cylinder in a zig-zag manner which is determined by the staggered arrangement of certain of the cylinder slots 106. These ribs 105 serve as lifting ribs by means of which the surplus granular material which is deposited on the inner surfaces of the cylinder by the hopper units 77 but is not discharged through the slots 106 is picked up and re-deposited in the hoppers 80.

With reference to the color drifts 64 and 67 shown in Figure 10, it will be understood that the pattern arrangement of the cylinder ribs and slots of these two color drifts will be varied from that shown in Figures 18 to 21 inclusive in order to provide for the deposit of all the brick-simulating granular patches 66 by the color drift 64 and for the deposit of the remaining brick simulating areas 68 by the color drift 67.

Having thus described the nature of my invention and a number of specific examples, it will be understood that various modifications may be resorted to within the scope and spirit of the invention as defined by the appended claims.

I claim:

1. A method of producing a relatively stiff and rigid masonry simulating siding panel which comprises grooving one side of a relatively stiff and rigid base of insulating material to thereby provide said base with a preformed brick wall design consisting of raised brick simulating areas bordered by longitudinally and transversely extending depressed mortar joint simulating areas, applying a coating of adhesive material to the brick and mortar joint simulating areas of said insulating base, covering the masonry simulating surface of the base by superimposing thereon a granular surfaced cap sheet having the granular surface thereof exposed, subjecting the resulting assembly to a cold pressing operation in which uniform pressure is exerted against the exposed granular surfaced side of the cap sheet to thereby firmly unite brick simulating areas of the cap sheet to the underlying brick simulating areas of the insulating base and to simultaneously depress other mortar joint simulating areas of the cap sheet into bonding engagement with the defining walls of the depressed mortar joint simulating areas of the base and thereafter subjecting said assembly to a hot pressing operation in which pressure is applied only to the depressed portions of the cap sheet to depress these areas of the cap sheet deeper into the underlying insulating base.

2. A method of producing a substantially thick and rigid masonry simulating siding panel which comprises grooving one side of a relatively stiff and rigid base of insulating material to thereby provide said base with a preformed masonry simulating brick wall design consisting of raised brick simulating areas bordered by depressed longitudinally and transversely extending mortar joint simulating areas, applying a coating of adhesive material to the brick and mortar joint simulating areas of said base, applying to one side of a cap sheet of roofing material a covering layer of granular particles partially embedded in an underlying layer of asphalt, superimposing the cap sheet on the grooved masonry simulating side of the insulating base with the granular surface of the cap sheet exposed, subjecting the granular surfaced side of the cap sheet to pressure to thereby press masonry simulating portions of the cap sheet firmly against the underlying masonry simulating areas of the base and simultaneously depress other mortar joint simulating areas of the cap sheet into bonding engagement with the defining walls of the depressed mortar upper and lower cold rolls 48 and 49 (Fig. 8) which cooperate with each other to press the cap sheet and base together so that the masonry and mortar joint simulating areas of the cap sheet 8 are pressed or molded with uniform pressure against the corresponding areas of the base 4. In this connection it will be noted that the lower roll 49 is a plain surfaced roll while the upper roll 48 is a pattern forming roll provided with raised ribs 50 and sunken areas 50'. As the base and cap sheet assembly is passed between these rolls the mortar joint simulating areas 11 and 12 of cap sheet 8 are depressed into the mortar joint simulating areas 6 and 7 of base 4 by the ribs 50 of roll 48 and the brick simulating areas 9 and 10 of the cap sheet are simultaneously pressed against the underlying brick simulating areas 5 of the base by the sunken areas 50' of roll 48. From the cold rolls 48 and 49 the panel is passed between upper and lower rolls 53 and 54 of a hot roll pressing or molding unit 55. The lower roll 54 is a plain surfaced roll while the upper roll 53 is a hot pattern roll provided with raised ribs 57 and sunken areas 58 corresponding to those of the cold pattern roll 48. However, in the case of the hot pattern roll 53, the ribs 57 are made of increased height so that during its passage through the hot roll unit 55 the cap sheet 8 is subjected only to the pressure of the ribs 57 which bear against the mortar joint simulating areas 11 and 12 and serve to depress these areas deeper into the underlying base. The ribs 57 are made of such a width that they serve to even off the marginal edges of the brick simulating areas 9 and 10 of the cap sheet 8 so that these areas are formed with straight sharply defined edges which substantially improves the appearance of the panel. The hot pressing operation effected by the ribs 57 of the hot pattern roll 53 also serves to so completely embed the granules of the mortar joint simulating areas of the cap sheet in the underlying asphalt so that these mortar joint simulating areas have a substantially uniform black appearance contrasting sharply with the color of the brick simulating areas 9 and 10.

In the foregoing I have described a two-stage application of the brick simulating areas 9 and 10 to the cap sheet 8 by the use of the pick-up rolls 35 and 43 and the conventional color drifts 38 and 44 but it will be understood that by increasing the number of pick-up rolls and color drifts it is possible to apply the brick simulating patches of asphalt to the base granular surface layer 16 of the cap sheet in three or more stages and to surface the asphalt patches applied in each stage with granular material of color characteristics different from that of the granular material employed for surfacing the asphalt patches applied in each of the remaining stages.

Figs. 10 to 11 inclusive illustrate a modified procedure which may be followed in surfacing the cap sheet of the insulating panel with a single layer of granular material to provide brick colored areas of contrasting color characteristics. In this case a web 60 of roofing felt which has previously been saturated with a waterproofing compound is passed around a guide roll 61 into contact with a coating roll 62 which applies a coating layer 63 of asphalt to one side of the web. From guide roll 61 the web passes beneath a special type of color drift 64 which, as hereinafter described, is designed to deposit, on predetermined portions of the coated side of the web, a plurality of patches of granular particles which adhere to the asphalt coating 63 to form brick simulating areas 66, as shown in Fig. 11. From the color drift 64 the web is passed beneath a second color drift 67 designed to deposit brick simulating patches 68 of granular material on those portions of the coated side of the web which were not covered by the patches of granules deposited by the first color drift 64. The brick simulating patches 66 deposited on the web by the color drift 64 are contrastingly colored with reference to the brick simulating patches 68 of granular material deposited on the web by the second color drift 67. By this method, it is possible to provide the web with a single layer granular surface including brick simulating areas 66 which are contrastingly colored as compared with the remaining brick simulating areas 68 of the complete brick simulating pattern.

The granular surfaced web formed as shown in Figs. 10 and 11 is cut into individual cap sheets of the required size which are assembled with their respective bases 4 and then passed successively between the component rolls of the previously described cold roll and hot roll pressing units so that the merging marginal portions of the brick simulating areas 66 and 68 are depressed into the underlying grooves 6 and 7 of the base 4 to provide depressed mortar-joint simulating areas sharply defining the edges of the brick simulating areas 66 and 68.

The procedure illustrated by Figures 9 to 11 inclusive may be modified as shown in Figures 13 and 14. In the latter instance, a third color drift 70 of conventional design is used in conjunction with the special color drifts 64 and 67. The color drift 64, shown in Figure 13, is designed to deposit, on the asphalt-coated surface 63 of web 60, the brick-simulating patches of granular material indicated at 72 in Fig. 14. The brick-simulating patches of granular material indicated at 73 in Figure 14 are deposited by the color drift 67. The remaining brick-simulating patches of granular material indicated at 74 in Figure 14 are deposited by the conventional color drift 70. The color characteristics of the granular mix deposited by each color drift shown in Fig. 13 is predetermined so that it contrasts with the color characteristics of the granular mix deposited by each of the other color drifts shown in said figure. The mortar joint simulating areas indicated at 75 and 76 in Fig. 14 are formed, after the granular surfaced cap sheet has been associated with its base 4, by depressing merging marginal portions of the brick simulating areas 72, 73 and 74 into the mortar joint simulating grooves 6 and 7 of the base, this being accomplished by passing the assembled base and granular surfaced cap sheet between the component rolls of the cold-roll and hot roll pressing units shown, respectively, in Figures 8 and 9.

Each of the special color drifts diagrammatically shown at 64 and 67 in Figures 10 and 13 comprises a stationary, granular-mix, feed hopper unit 77 arranged within a rotating cylinder 78. Each cylinder 78 is provided, as hereinafter described, with a pattern arrangement of slots through which granular material fed from the associated hopper 77 is deposited on predetermined areas of the asphalt coating 63 of web 60.

As shown in Figs. 22 and 23, the hopper unit 77 of each of the color drifts 64 and 67 comprises a hopper 80 provided with a bottom discharge opening 81 through which a mixture of granular material of predetermined color characteristics is delivered to a feed roll 82 journalled in bearings joint simulating areas of the base and thereafter subjecting said assembly to a hot pressing operation in which pressure is applied to the depressed masonry simulating areas of the cap sheet but not to the brick simulating areas of the cap sheet, said last mentioned pressing operation serving to depress the mortar joint simulating areas of the cap sheet deeper into the underlying mortar joint simulating areas of the base and to cause the granules of the mortar joint simulating areas of the cap sheet to be substantially completely embedded in the underlying asphalt coating of the cap sheet.

3. The method of claim 1, characterized in that the granular surface of the cap sheet consists of granular mixes of different color characteristics applied so that, in the finished panel, the color characteristics of the granular mixes covering certain of the brick simulating areas of the cap sheet will contrast with the color characteristics of both the mortar joint simulating areas and the remaining brick simulating areas of said cap sheet.

WILLIAM A. LAWSON.

References Cited in the file of this patent

UNITED STATES PATENTS

| Number | Name | Date |
|---|---|---|
| 1,144,313 | Wright | June 22, 1915 |
| 1,394,149 | Cumfer et al. | Oct. 18, 1921 |
| 1,414,778 | Elvidge | May 2, 1922 |
| 1,448,203 | Cumfer et al. | Mar. 13, 1923 |
| 1,484,760 | Cumfer | Feb. 26, 1924 |
| 1,513,969 | Cumfer et al. | Nov. 4, 1924 |
| 1,517,826 | Cumfer et al. | Dec. 2, 1924 |
| 1,952,754 | Harshberger | Mar. 27, 1934 |
| 2,056,274 | Holdsworth | Oct. 6, 1936 |
| 2,151,220 | Mattes | Mar. 21, 1939 |
| 2,178,273 | Wittenberg | Oct. 31, 1939 |
| 2,214,387 | Snyder | Sept. 10, 1940 |
| 2,245,047 | Odell | June 10, 1941 |
| 2,543,251 | Muench | Feb. 27, 1951 |